United States Patent
Yoo et al.

(10) Patent No.: US 7,355,951 B2
(45) Date of Patent: Apr. 8, 2008

(54) HIGH DENSITY DATA RECORDING/REPRODUCTION METHOD UTILIZING ELECTRON EMISSION AND PHASE CHANGE MEDIA, AND DATA RECORDING SYSTEM ADOPTING THE SAME, AND MEDIA FOR THE SYSTEM

(75) Inventors: In-kyeong Yoo, Suwon (KR); Won-bong Choi, Yongin (KR); Hyun-jung Shin, Seongnam (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 508 days.

(21) Appl. No.: 10/252,085

(22) Filed: Sep. 23, 2002

(65) Prior Publication Data

US 2003/0058749 A1    Mar. 27, 2003

(30) Foreign Application Priority Data

Sep. 22, 2001    (KR) .................................. 2001-58854

(51) Int. Cl.
*G11B 9/00*    (2006.01)
(52) U.S. Cl. ..................... 369/101; 369/126; 369/13.1; 369/13.14
(58) Field of Classification Search .............. 369/13.01, 369/101, 126, 13.56, 283, 284, 288, 100, 369/275.2, 13.14, 275.4, 275.3; 445/50; 438/20; 427/571, 127, 131; 428/156, 141, 428/688, 836.3, 900; 347/111; 250/306, 250/307
See application file for complete search history.

(56) References Cited

U.S. PATENT DOCUMENTS

| | | | |
|---|---|---|---|
| 4,760,567 A | * | 7/1988 | Crewe ........................ 369/101 |
| 4,817,053 A | | 3/1989 | Ikeda et al. |
| 5,006,395 A | * | 4/1991 | Hori et al. ................... 428/141 |
| 5,123,007 A | * | 6/1992 | Miyauchi et al. ........... 369/100 |
| 5,270,990 A | | 12/1993 | Mizasawa et al. |
| 5,270,995 A | * | 12/1993 | Wada et al. ................. 369/101 |
| 5,319,198 A | | 6/1994 | Wada |
| 5,368,986 A | * | 11/1994 | Terao et al. ................. 369/284 |
| 5,525,379 A | * | 6/1996 | Takada et al. .............. 427/571 |
| 5,580,639 A | * | 12/1996 | Togawa et al. ............. 428/156 |

(Continued)

FOREIGN PATENT DOCUMENTS

JP    63-018541    1/1988

(Continued)

*Primary Examiner*—Hoa T. Nguyen
*Assistant Examiner*—Kim-Kwok Chu
(74) *Attorney, Agent, or Firm*—Lee & Morse, P.C.

(57) ABSTRACT

A rapid data recording/reproducing method, a data recording system adopting the same, media for the system, and a tracking method, wherein the recording/reproducing method includes preparing media having a data recording layer in which a phase change is generated through electron absorption, generating electrons using an electron generating source at a position separated from the data recording layer by a predetermined interval, forming a magnetic field on the path of the electrons and cyclotron moving the electrons, recording data through local melting and cooling due to absorption of the electrons by the data recording layer. A micro-tip does not contact the data recording layer during electron collisions therewith, hence no damage is caused by or to the micro-tip. The present invention allows the region where the electron beam reaches the data recording layer to be minimized thereby maximizing the data recording density.

41 Claims, 7 Drawing Sheets

U.S. PATENT DOCUMENTS

| | | | |
|---|---|---|---|
| 5,623,295 A * | 4/1997 | Kishi et al. | 347/111 |
| 5,965,323 A * | 10/1999 | Takahashi et al. | 430/270.13 |
| 6,165,579 A * | 12/2000 | Nakamura | 369/283 |
| 6,473,388 B1 * | 10/2002 | Gibson | 369/126 |
| 6,607,415 B2 * | 8/2003 | Dunfield et al. | 445/50 |
| 6,700,853 B2 * | 3/2004 | Raese | 369/101 |
| 6,735,163 B2 * | 5/2004 | Marshall | 369/126 |
| 6,741,524 B2 * | 5/2004 | Ichihara et al. | 369/13.01 |

FOREIGN PATENT DOCUMENTS

| | | |
|---|---|---|
| JP | 63-281246 | 11/1988 |
| JP | 03-228294 | 10/1991 |
| JP | 05-159735 | 6/1993 |
| KR | 2001-11840 | 2/2001 |
| KR | 10-0257705 | 6/2001 |

* cited by examiner

HIGH DENSITY DATA RECORDING/REPRODUCTION METHOD UTILIZING ELECTRON EMISSION AND PHASE CHANGE MEDIA, AND DATA RECORDING SYSTEM ADOPTING THE SAME, AND MEDIA FOR THE SYSTEM

BACKGROUND OF THE INVENTION

1. Field of the Invention

The present invention relates to a data recording/reproduction method, a data recording system adopting the same, media for the data recording system, and a tracking method for the data recording system. More particularly, the present invention relates to a data recording/reproduction method in which an electron beam is scanned into a phase change media, a data recording system adopting the same, media for the data recording system, and a tracking method for the data recording system.

2. Description of the Related Art

Compact discs (CDs) and digital versatile discs (DVDs), in which a laser is used for recording and reproducing data have limited data recording density due to limitations on a wavelength of the laser. A data storage system that uses a vertical magnetic recording method has a comparatively high recording density. However, this recording density is also limited due to the size of a probe for approaching media and recording or reproducing data.

In order to overcome the limits on recording density, a tip may be used for approaching or contacting media for recording and reproducing data. Methods utilizing such a tip include an atomic force microscope (AFM) method and a scanning probe microscope (SPM) method. These methods, however, are slow and may cause loss or detonation of data due to abrasion and vibration of the tip.

Preferable to the previously described methods for recording and reproducing data are a scanning electron microscope (SEM) method, which utilizes an electron beam, and a transmission electron microscope (TEM) method. Both the SEM and TEM methods are capable of achieving very high recording density of data. However, these methods require very large scale facilities, and thus cannot be practically applied to a portable data recording system.

SUMMARY OF THE INVENTION

In an effort to solve the aforementioned problems, it is a feature of an embodiment of the present invention to provide a high density data recording/reproduction method utilizing an electron beam and phase change media, a data recording system adopting the same, media for the data recording system, and a tracking method for the data recording system.

It is another feature of an embodiment of the present invention to provide a data recording/reproduction method having a high recording density and allowing miniaturization, a data recording system adopting the same, media for the data recording system, and a tracking method for the data recording system.

To provide these and other features, according to one aspect of the present invention, there is provided a data recording method. The data recording method includes preparing media having a data recording layer in which a phase change is generated through electron absorption, generating electrons according to data for recording using an electron generating source at a position separated from the data recording layer by a predetermined interval, forming a magnetic field on the path of the electrons and cyclotron moving the electrons, and transmitting the cyclotron moved electrons onto the data recording layer and performing data recording through local melting and cooling due to the absorption of the electrons by the data recording layer.

It is preferable that the interval between the electron generating source and the data recording layer is controlled such that after the electrons have been emitted by the electron generating source, the electrons are rotated once, or an integer multiple number of times, during cyclotron movement.

It is also preferable that an electric field emitting means, including a micro-tip for emitting electrons and a gate electrode interposed between the micro-tip and the data recording layer, is adopted as the electron generating source.

It is also preferable that the magnetic field on the path of the electrons is perpendicular to the data recording layer, and the magnetic field is formed by a direct current (DC) magnetic field forming means positioned at both sides of the electron generating source and the media.

To provide the aforementioned features and others, according to another aspect of the present invention, there is provided a data recording system. The data recording system includes media having a data recording layer in which a phase change is generated through electron absorption, an electron generating source installed at a position separated from the data recording layer by a predetermined interval for emitting electrons according to data for recording on the data recording layer, and a magnetic field generating source for forming a magnetic field for cyclotron movement of the electrons on the path of the electrons between the electron generating source and the media.

It is preferable that the interval between the electron generating source and the data recording layer is controlled such that after the electrons have been emitted by the electron generating source, the electrons are rotated once, or an integer multiple number of times, during cyclotron movement.

It is also preferable that the electron generating source includes a micro-tip for emitting electrons using an electric field and a gate electrode for controlling electron emission from the micro-tip. It is preferable that the interval between the gate electrode and the micro-tip and/or the interval between the gate electrode and the media may be controlled.

The magnetic field generating source forms a magnetic field perpendicular to the data recording layer. According to an embodiment of the present invention, the system includes a direct current (DC) magnetic field forming means formed of a permanent magnet or an electromagnet, which is positioned at both sides of the electron generating source and the media.

To provide the aforementioned features and others, according to another aspect of the present invention, there is provided media for a data recording system. The media includes a data recording layer in which a phase change is generated through electron absorption and a conductive substrate for supporting the data recording layer.

According to an embodiment of the present invention, the data recording layer includes a phase change material layer formed on the entire surface of the substrate and an insulation layer having channels formed at a predetermined spacing on the phase change material layer.

To provide the aforementioned features and others, according to another aspect of the present invention, there is provided a tracking method for a data recording system including preparing media having grooves exposing a data recording layer in which a phase change is generated through electron absorption, generating electrons according to data for recording using an electron generating source at a position separated from the data recording layer by a predetermined interval, forming a magnetic field on the path of the electrons and cyclotron moving the electrons, transmitting the cyclotron moved electrons onto the data recording layer, detecting secondary electrons or scattered electrons generated by the media from above both sides of the groove into which an electron beam is transmitted, and adjusting the position of the electron generating source according to the amount of secondary electrons or scattered electrons detected, such that the same amount of electrons within a predetermined range are detected at each side of the groove.

The data recording method and the data recording system adopting the same according to the present invention are able to store and erase data by remotely scanning an electron beam into media for high density data storage and data decryption, to detect scattering of the electron beam from media by scanning the electron beam into stored data, or to detect current flowing through a data portion, thereby decrypting data.

BRIEF DESCRIPTION OF THE DRAWINGS

The above features and advantages of the present invention will become more apparent to one of ordinary skill in the art by describing in detail preferred embodiments thereof with reference to the attached drawings in which.

DETAILED DESCRIPTION OF THE INVENTION

Korean Patent Application No. 2001-58854, filed on Sep. 22, 2001, and entitled: "High Density Data Recording/Reproduction Method Utilizing Electron Emission and Phase Change Media, and Data Recording System Adopting the Same, and Media for the System," is incorporated by reference herein in its entirety.

Figure 1:
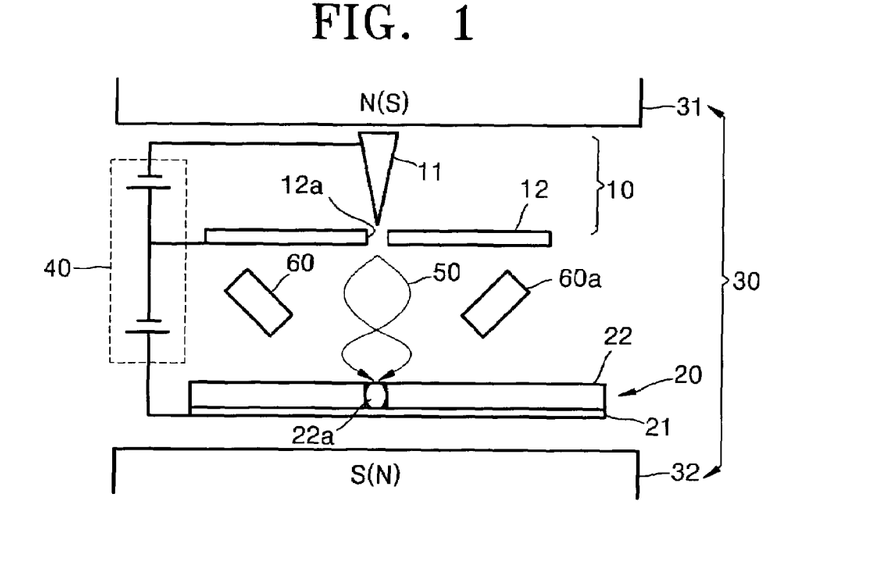
FIG. 1 illustrates the basic structure of a data recording/reproduction system according to the present invention to aid in explaining the data storage method and system according to the present invention.
Figure 2:
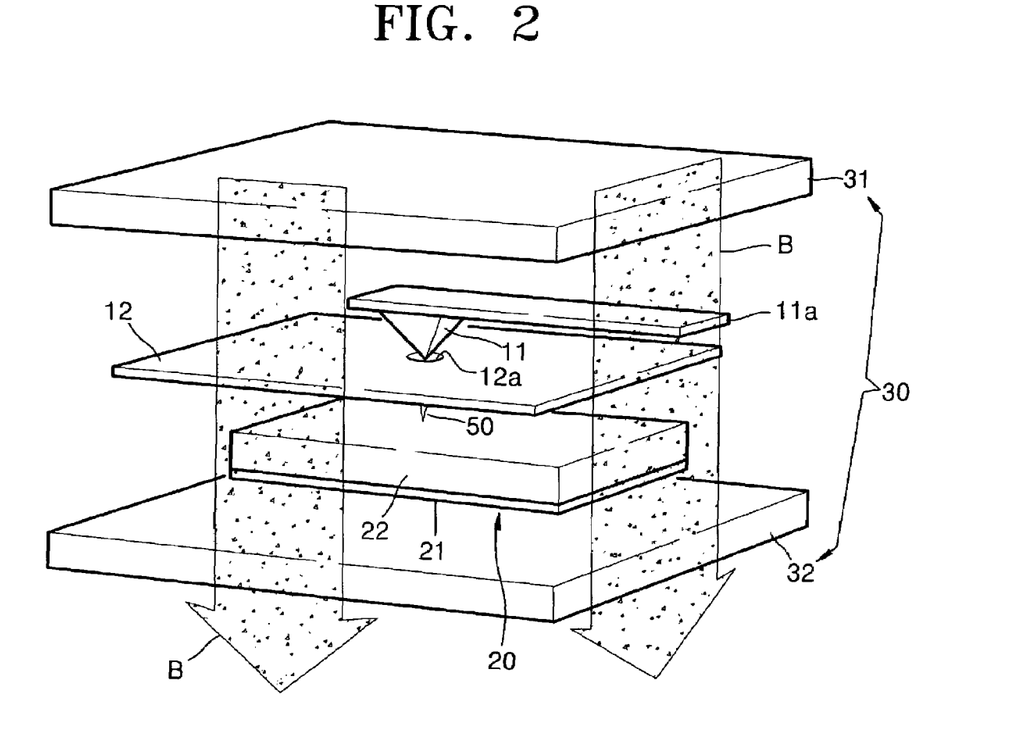
FIG. 2 depicts a perspective view illustrating the schematic configuration of the data recording system according to the present invention.

Referring to FIGS. 1 and 2, an electron generating source 10 including a gate electrode 12 and a micro-tip 11 is positioned above media 20 including a data recording layer 22 having a data recording region formed of a phase change material such as GeTeSb, and a substrate 21 for supporting the data recording layer 22. As shown in FIG. 2, the micro-tip 11 is held at the end of a conductive cantilever 11a, and a vertical magnetic field B is formed by a magnetic field generating source 30. Meanwhile, an upper magnetic field generating source 31 and a lower magnetic field generating source 32 constituting the magnetic field generating source 30 are respectively positioned above the electron generating source 10 and below the media 20.

The micro-tip 11 and the gate electrode 12 below the micro-tip 11 basically adopt an electric field emission structure. An emitter for emitting electrons through an electric field, that is, the gate electrode 12 below the micro-tip 11, has a gate hole 12a through which electrons pass. Electron detectors 60 and 60a for detecting scattering electrons or secondary electrons generated through electron collision from the data recording layer 22 are positioned below the gate electrode 12. The gate electrode 12 controls electron emission caused by the micro-tip 11, and simultaneously converges a beam generated by emitted electrons around the gate hole 12a, essentially near the lower portion of the gate hole 12a. A signal from the electron detectors may be used as a reproduction signal.

The micro-tip 11 is biased to a negative voltage by a driving circuit 40, and a predetermined positive voltage is applied to the gate electrode 12. In addition, the substrate 21 of the media 20 is a kind of collector, and a positive substrate voltage, higher than the gate voltage, is applied to the substrate 21. The gate voltage and the substrate voltage are properly varied by the driving circuit 40, thereby controlling electron emission from the micro-tip 11 and electron collision with the data recording layer 22 of the media 20. The voltage applying structure is adopted from a conventional field emission structure having three poles, and thus will not be further described.

The upper and lower magnetic field generating sources 31 and 32 of the magnetic field generating source 30 adopts a permanent magnet or an electromagnet, to form magnetic flux passing perpendicularly through the media 20. Due to the magnetic flux and an electric field between the gate electrode 12 and the media 20, cyclotron movement of the electron beam 50 between the gate electrode 12 and the media 20 is generated. That is, electrons which passed the gate electrode 12 after being emitted from the micro-tip 11 are rotated by the magnetic field and the electric field parallel with the magnetic field and go into the data recording layer 22.

Likewise, if the electrons collide with the data recording layer 22 through cyclotron movement with a high kinetic energy and are absorbed into the data recording layer 22, the data recording layer 22 is locally melted and cooled. As a result, a local amorphous portion, or data dot, 22a is generated in the data recording layer 22. The amorphous portion 22a is generated in a minor hole or groove of the data recording layer 22 filled with a phase change material, which will be described later according to an embodiment of the present invention.

The present invention gives electrons a high kinetic energy through cyclotron movement, causing the electrons to collide with the data recording layer 22 to form a data dot of an amorphous or crystalline portion, thereby recording data. In such a case, the size of a data portion caused by electron collision is inversely proportional to data recording density. That is, if the data portion is large, the data recording density is low, and in the reverse case, the data recording density is high. Here, the size of the data portion may be a quantum dot of an atomic size, by properly adjusting the distance between the gate electrode 12 and the data recording layer 22 according to a preferred embodiment of the present invention. For this purpose, the distance between the gate electrode 12 and the data recording layer 22 is set such that rotating electrons emitted from the micro-tip 11 and proceeding in the form of a whirlwind, or cyclotron movement, reach the data recording layer 22 after one rotation. However, in an alternative embodiment, the distance between the gate electrode 12 and the data recording layer 22 may be set as a multiple of the distance just described.

Figure 3:
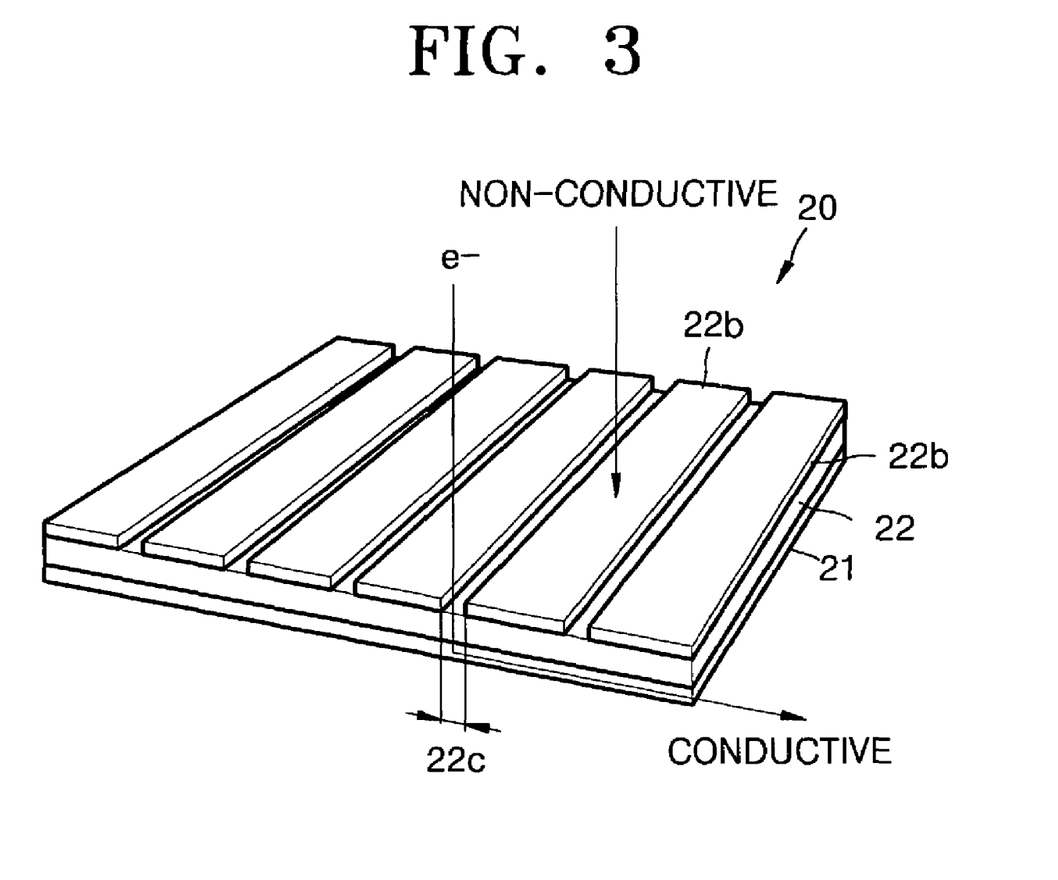
FIG. 3 depicts a schematic cross-sectional view of media according to an embodiment of the present invention.

FIG. 3 depicts a schematic cross-sectional view of media according to an embodiment of the present invention. The media 20 in the present embodiment includes data recording layer 22, which is formed of a phase change material, formed on the substrate 21, which is conductive, and a dielectric material layer 22b having a strip shape formed on the data recording layer 22, which is formed of a phase change material, at predetermined intervals. Here, a portion not covered by the dielectric material layer 22b corresponds to a groove 22c in which data is recorded by electrons $e^-$.

As described above with reference to FIGS. 1 and 2, the electrons emitted from the micro-tip 11 are cyclotron moved by an electric field between the gate electrode 12 and the substrate 21 and a magnetic field parallel to the electric field, and converge on a dot with a one-to-one correspondence to the position where the electrons were generated regardless of scattering of the beam, if the magnetic field is controlled such that the electrons rotate once within the distance between the micro-tip 11 and the substrate 21. In such a case, the kinetic energy of the electrons causes them to penetrate the data recording layer 22, which is formed of a phase change material, and generate heat, changing the phase of a portion of the data recording layer 22 where the electrons are absorbed. The kinetic energy of the electrons is controlled by the voltage between the gate electrode 12 and the substrate 21. The size of the magnetic field through path of the electrons is determined by the voltage and the distance between the surface of the gate electrode 12 and the surface of the data recording layer 22. Thus, preferably, the distance between the gate electrode 12 and the data recording layer 22 is constantly maintained, and recording data on the data recording layer 22 is controlled by variation in the electric field and the magnetic field.

In the structure described above, the position of the micro-tip 11 relative to the gate electrode 12 below the micro-tip 11 is fixed, and the data recording layer 22 may be moved. The structure may be adopted in a conventional vertical magnetic recording method or a conventional magnetic recording method.

Hereinafter, the principle of recording and reproducing data according to the present invention will be described.

Figure 4:
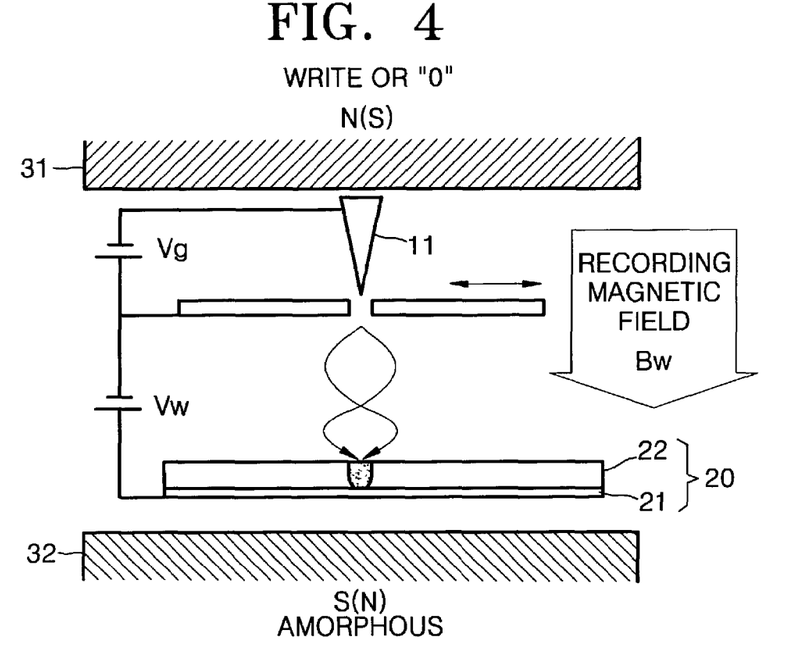
FIG. 4 illustrates a principle by which a data portion is formed through amorphism during writing.
Figure 5:
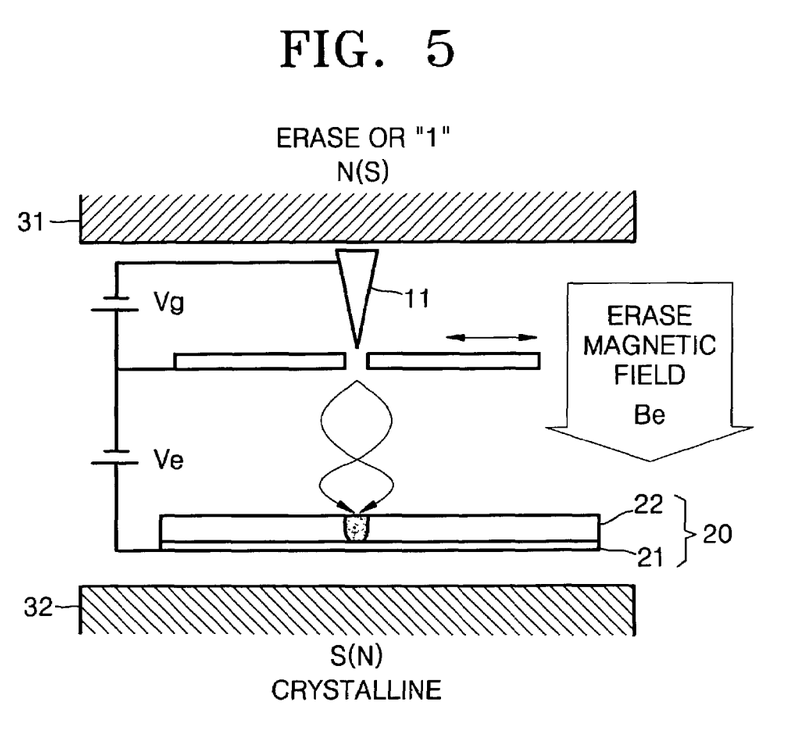
FIG. 5 illustrates a principle by which a data portion is formed through crystallization during writing.

FIG. 4 illustrates a principle in which a data portion is formed through amorphism during writing in a state where a writing magnetic field Bw is applied. FIG. 5 illustrates crystallization during writing (specifically, during erasing) in a state where an erase magnetic field Be is applied.

The phase of a phase change material constituting the data recording layer 22 is determined by the kinetic energy of incident electrons. Thus, as shown in FIG. 4, in a case where the highest recording voltage Vw is applied by upper and lower permanent magnets 31 and 32, the kinetic energy of the electrons reaching the surface of the data recording layer 22 is eVw, where e is $1.6 \times 10^{-19}$ coul. Thus, the recording voltage Vw is determined such that the phase change material is sufficiently melted by the energy of eVw. The melted portion instantly cools, and thus is left in an amorphous state. This is a process of recording data through amorphism.

In order to erase data, as shown in FIG. 5, an erase voltage Ve lower than the recording voltage Vw of FIG. 4, is applied, and the electrons colliding with the surface of the data recording layer 22 are absorbed thereby generating sufficient heat to crystallize the data recording layer 22.

Figure 6:
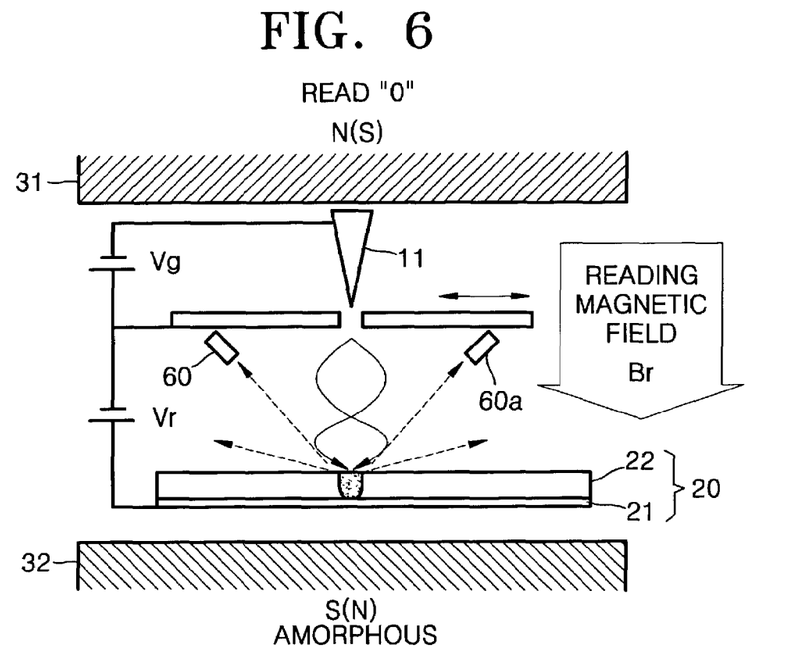
FIG. 6 illustrates the principle by which an amorphous portion is read during reading.
Figure 7:
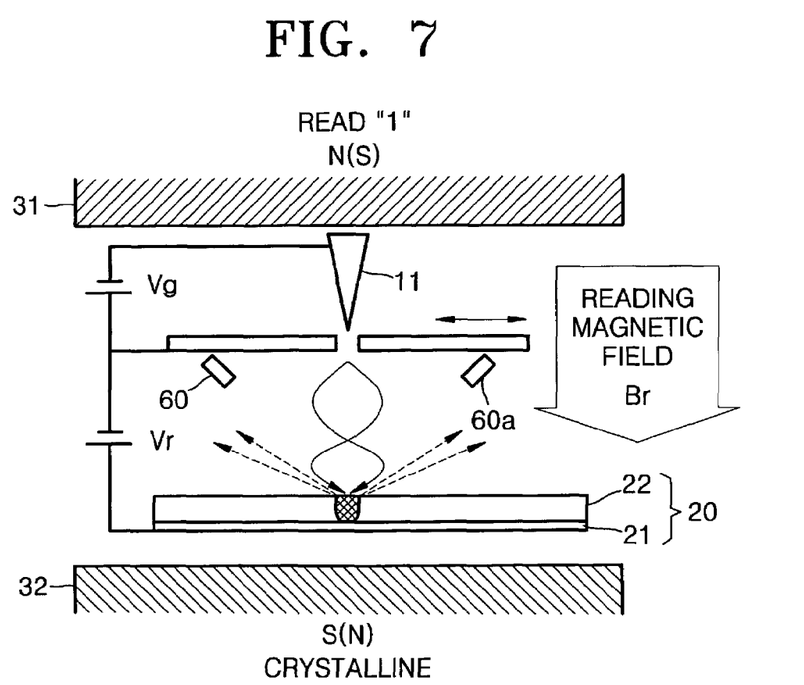
FIG. 7 illustrates the principle by which a crystalline portion is read during reading.

FIG. 6 illustrates a principle in which an amorphous portion is read when a vertical reading magnetic field Br is applied. FIG. 7 illustrates a principle in which a crystalline portion is read.

In order to recognize data at the amorphous portion and the crystalline portion on the data recording layer 22, as shown in FIGS. 6 and 7, respectively, the lowest reading voltage Vr is applied. In such a case, the reading voltage Vr has a sufficiently small potential, so that the kinetic energy of eVr causes no phase change on the data recording layer 22. The electrons colliding with the substrate 21 of the data recording layer 22 with energy of eVr are scattered and absorbed, generating secondary electrons. In such a case, the degree of scattering of the electrons varies depending on the phase of the portion of the data recording layer 22 where the electrons strike. That is, as shown in FIG. 6, the electrons scatter very briskly at the amorphous portion, and as shown in FIG. 7, the electrons scatter less at the crystalline portion. Thus, the phase at the portion of the data recording layer 22 where the electrons strike may be detected according to the scattering of the electrons by the above-described electron detectors 60 and 60a installed near the scattering region of the electrons.

Figure 8:
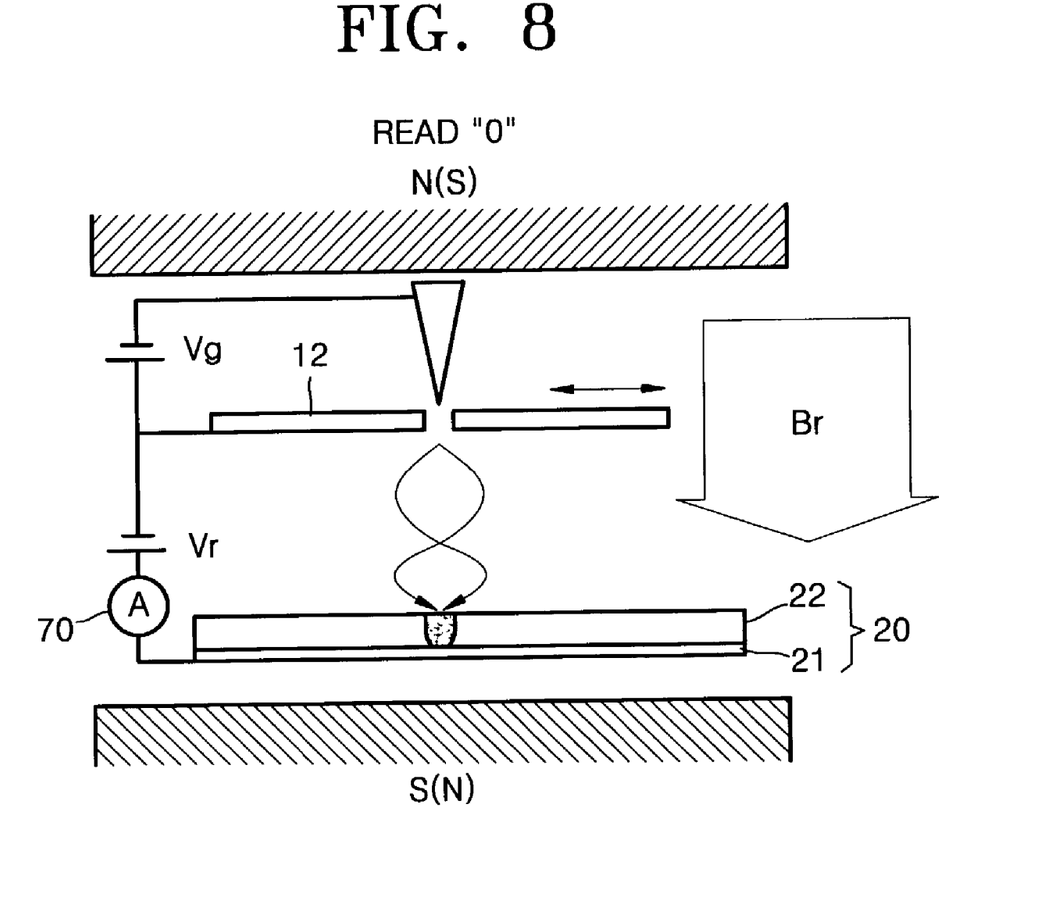
FIG. 8 illustrates a reading method shown in FIGS. 6 and 7 and the principle of reading data according to another variation in current.

FIG. 8 illustrates a reading method shown in FIGS. 6 and 7 and a principle of reading data according to a variation in current.

In this method, variation in beam current is detected between the gate electrode 12 and the media 20 by incident electrons, and is used as data.

In other words, a detector for detecting current such as an ammeter 70 or a sensor, is provided on an electrical path between the conductive substrate 21 of the media 20 and the gate electrode 12. Thus, if an electron beam is given an energy of eVr by the reading voltage Vr and is transmitted onto the data recording layer 22, the current between the media 20 and the gate electrode 12 varies according to the crystalline and amorphous portions of the data recording layer 22. In such a case, the magnitude and variation of the current are small, and thus, the ammeter 70 preferably has a separate current amplifier.

In a case where the data recording layer 22 of the media 20 is formed of a single layer, the data recording region is preferably limited by a dielectric layer or an electrical insulation layer, and thereby a portion of the data recording layer 22 where actual data will be recorded is either formed in a groove of a restricted size, or exposed by an insulation layer, so as to allow the portion where the electron beam strikes to be precisely tracked. This is referred to as preformatting.

Hereinafter, a process for manufacturing the media shown in FIG. 3 according to an embodiment of the present invention will be described with reference to FIGS. 9A through 9E.

Figure 9A:
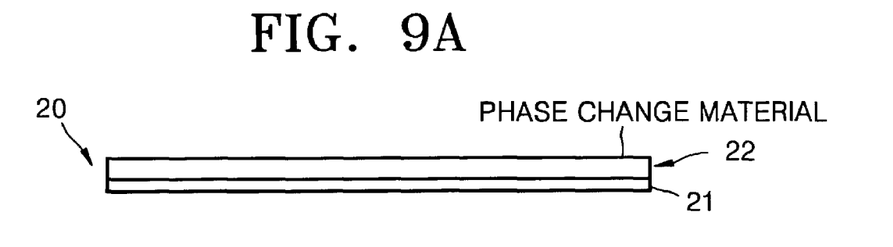
FIGS. 9A through 9E depict pre-formatting process views of the media shown in FIG. 3, according to the present invention.

As shown in FIG. 9A, the data recording layer 22 is formed of a phase change material on the prepared conductive substrate 21.

Figure 9B:
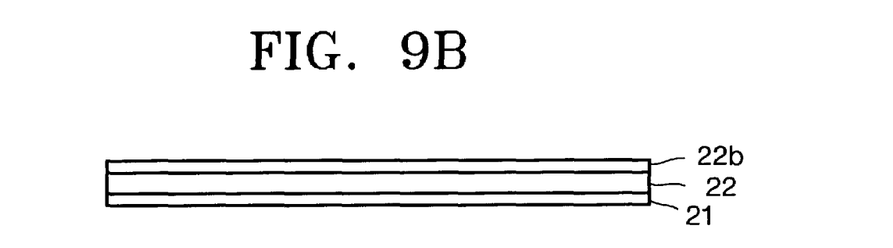

As shown in FIG. 9B, an insulation or dielectric material layer 22b is formed on the phase change material data recording layer 22.

Figure 9C:
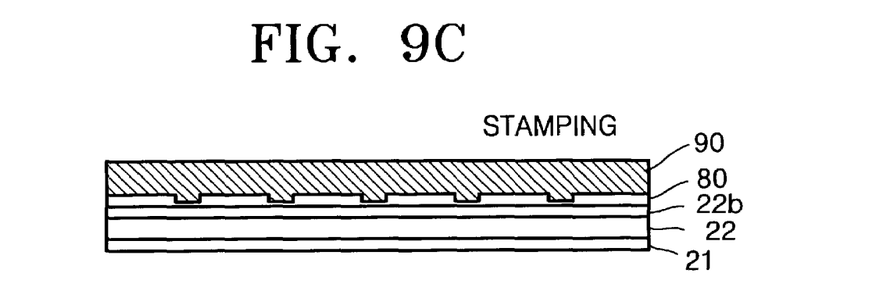

As shown in FIG. 9C, a polymer layer 80 is formed on the insulation or dielectric material layer 22b. Grooves for recording data are formed in the polymer layer 80 by stamping with a stamp 90 having protrusions formed at a predetermined spacing.

Figure 9D:
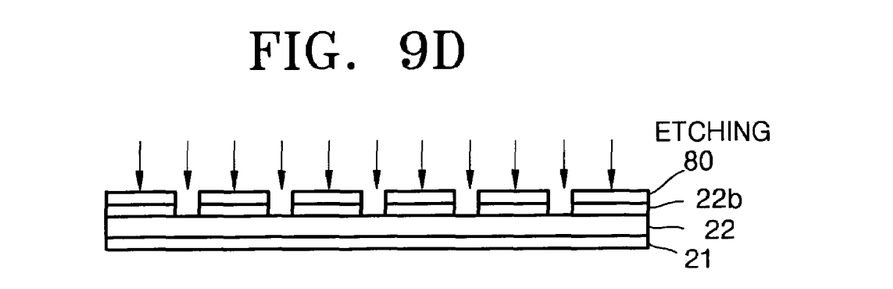

As shown in FIG. 9D, a thin portion of the polymer layer 80 remaining at the bottom of the groove is first etched, and thereby the insulation or dielectric material layer 22b under the polymer layer 80 is etched so that the phase change material data recording layer 22 is exposed at the bottom of the groove.

Figure 9E:
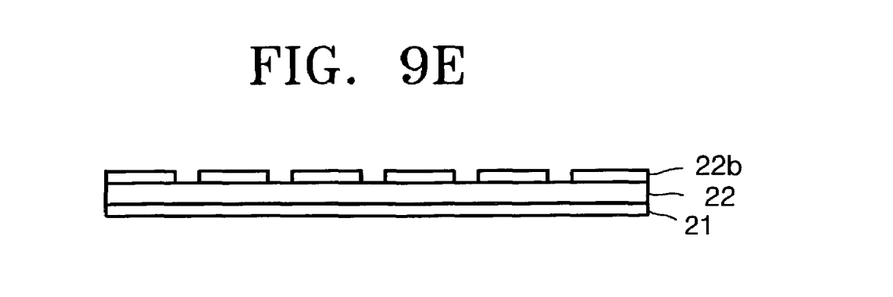

As shown in FIG. 9E, the polymer layer 80 remaining on the insulation or dielectric material layer 22b is removed.

Figure 10A:
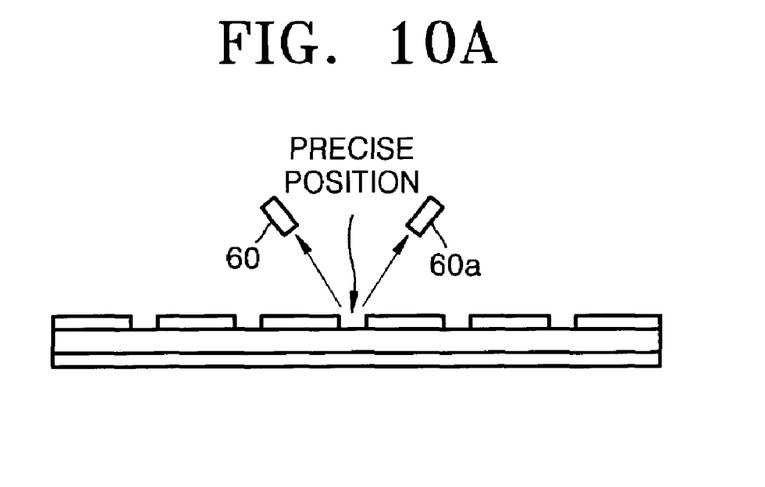
FIGS. 10A through 10C illustrate different types of tracking errors according to landing positions of an electron beam in the data recording system utilizing the media shown in FIG. 3 as recording media, according to the present invention.
Figure 10B:
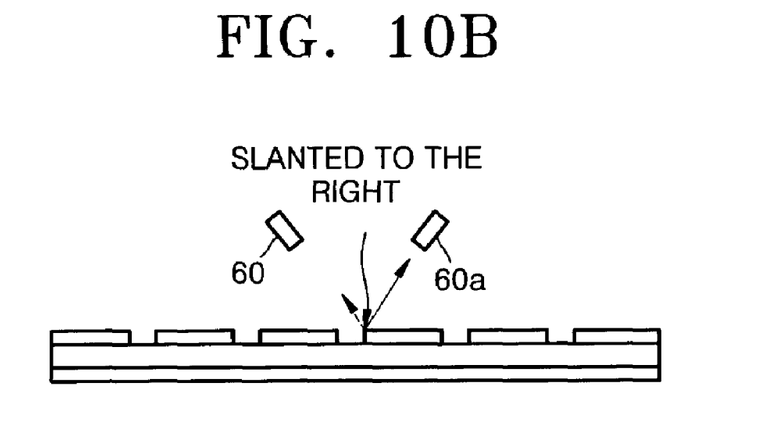
Figure 10C:
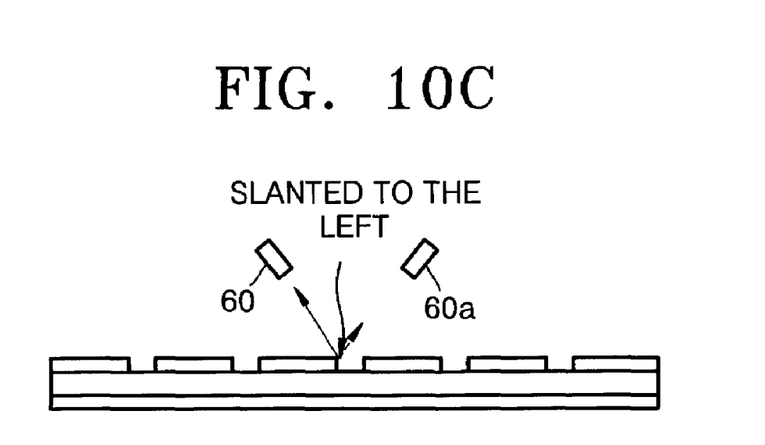

FIGS. 10A through 10C illustrate different types of tracking errors according to the position of impact of the electron beam in the data recording system utilizing the media shown in FIG. 3 as recording media according to the present invention.

FIG. 10A illustrates a state where the electron beam precisely strikes the center of the groove. Scattering of the electrons or secondary electrons occurs uniformly in all directions, and thus an equal amount of electrons within a predetermined range are detected by the electron detectors 60 and 60a above the scattering region of the electrons. In such a case, there are no tracking errors, and thus tracking correction of the electron generating source is unnecessary.

FIGS. 10B and 10C illustrate a state where the electron beam strikes one side of the bottom of the groove or the insulation layer above the groove. The electrons or secondary electrons are scattered briskly in one direction. Thus, more electrons are detected by one of the two electron detectors 60 and 60a above the scattering region of the electrons. In such a case, there are tracking errors, and thus a tracking correction must be made to the electron generating source in order to return to the preferred state of FIG. 10A after trials and errors.

According to the present invention, the micro-tip does not contact the data recording layer during electron collisions with the data recording layer, and thus no damage is caused by or to the micro-tip, as is the case in a conventional AFM method. The present invention also allows very rapid data recording and reproduction. In addition, because the electron beam is converged onto the data recording layer through cyclotron movement, which gives the electrons high kinetic energy, proper adjustment of the distance between the electron generating source and the data recording layer allow the region where the electron beam reaches the data recording layer to be minimized, thereby maximizing the data recording density.

While the present invention has been particularly shown and described with reference to preferred embodiments thereof, it will be understood by those of ordinary skill in the art that various changes in form and detail may be made therein without departing from the spirit and scope of the present invention as set forth in the following claims.

What is claimed is:

1. A data recording method, comprising:
preparing media having a data recording layer in which a phase change is generated through electron absorption;
generating electrons according to data for recording using an electron generating source at a position separated from the data recording layer by a predetermined interval;
forming a magnetic field on the path of the electrons by disposing one pole of a magnet above the data recording layer and disposing an opposite pole of the magnet below the data recording layer, and cyclotron moving the electrons; and
transmitting the cyclotron moved electrons onto the data recording layer and performing data recording through local melting and cooling due to the absorption of the electrons by the data recording layer.

2. The data recording method as claimed in claim 1, further comprising controlling the interval between the electron generating source and the data recording layer such that after the electrons have been emitted by the electron generating source, the electrons are rotated once, or an integer multiple number of times, during cyclotron movement.

3. The data recording method as claimed in claim 2, further comprising providing an electric field emitting means including a micro-tip for emitting electrons and a gate electrode interposed between the micro-tip and the data recording layer in the electron generating source.

4. The data recording method as claimed in claim 3, wherein forming the magnetic field on the path of the electrons comprises forming the magnetic field on the path of the electrons perpendicular to the data recording layer.

5. The data recording method as claimed in claim 2, wherein forming the magnetic field on the path of the electrons comprises forming the magnetic field on the path of the electrons perpendicular to the data recording layer.

6. The data recording method as claimed in claim 2, further comprising:
providing an electron detector near a position of impact of the electron beam on the media; and
using a signal from the electron detector as a reproduction signal.

7. The data recording method as claimed in claim 1, further comprising providing an electric field emitting means including a micro-tip for emitting electrons and a gate electrode interposed between the micro-tip and the data recording layer in the electron generating source.

8. The data recording method as claimed in claim 7, wherein forming the magnetic field on the path of the electrons comprises forming the magnetic field on the path of the electrons perpendicular to the data recording layer.

9. The data recording method as claimed in claim 1, wherein forming the magnetic field on the path of the electrons comprises forming the magnetic field on the path of the electrons perpendicular to the data recording layer.

10. The data recording method as claimed in claim 1, further comprising:
providing an electron detector near a position of impact of the electron beam on the media; and
using a signal from the electron detector as a reproduction signal.

11. A data recording method, comprising:
preparing media having a data recording layer in which a phase change is generated through electron absorption;
generating electrons according to data for recording using an electron generating source at a position separated from the data recording layer by a predetermined interval;
forming a magnetic field on the path of the electrons and cyclotron moving the electrons;
transmitting the cyclotron moved electrons onto the data recording layer and performing data recording through local melting and cooling due to the absorption of the electrons by the data recording layer;

providing an electric field emitting means including a micro-tip for emitting electrons and a gate electrode interposed between the micro-tip and the data recording layer in the electron generating source;

providing a conductive substrate to the media;

applying a maximum substrate voltage to the conductive substrate; and applying a gate voltage lower than the substrate voltage to the gate electrode.

12. The data recording method as claimed in claim 11, wherein forming the magnetic field on the path of the electrons comprises forming the magnetic field on the path of the electrons perpendicular to the data recording layer.

13. The data recording method as claimed in claim 11, further comprising:

providing an electron detector near a position of impact of the electron beam on the media; and using a signal from the electron detector as a reproduction signal.

14. The data recording method as claimed in claim 11, further comprising reproducing data stored in the media by variation in a current between the substrate of the media and the gate electrode.

15. A data recording method, comprising:

preparing media having a data recording layer in which a phase change is generated through electron absorption;

generating electrons according to data for recording using an electron generating source at a position separated from the data recording layer by a predetermined interval;

forming a magnetic field on the path of the electrons and cyclotron moving the electrons;

transmitting the cyclotron moved electrons onto the data recording layer and performing data recording through local melting and cooling due to the absorption of the electrons by the data recording layer;

controlling the interval between the electron generating source and the data recording layer such that after the electrons have been emitted by the electron generating source, the electrons are rotated once, or an integer multiple number of times, during cyclotron movement;

providing an electric field emitting means including a micro-tip for emitting electrons and a gate electrode interposed between the micro-tip and the data recording layer in the electron generating source;

providing a conductive substrate to the media;

applying a maximum substrate voltage to the conductive substrate; and applying a gate voltage lower than the substrate voltage to the gate electrode.

16. The data recording method as claimed in claim 15, wherein forming the magnetic field on the path of the electrons comprises forming the magnetic field on the path of the electrons perpendicular to the data recording layer.

17. The data recording method as claimed in claim 15, further comprising:

providing an electron detector near a position of impact of the electron beam on the media; and using a signal from the electron detector as a reproduction signal.

18. The data recording method as claimed in claim 15, further comprising reproducing data stored in the media by variation in a current between the substrate of the media and the gate electrode.

19. A data recording system, comprising:

media having a data recording layer in which a phase change is generated through electron absorption;

an electron generating source installed at a position separated from the data recording layer by a predetermined interval for emitting electrons according to data for recording on the data recording layer; and a magnetic field generating source for forming a magnetic field for cyclotron movement of the electrons on the path of the electrons between the electron generating source and the media, the magnetic field generating source including one pole of a magnet disposed above the data recording layer and an opposite pole of the magnet disposed below the data recording layer.

20. The data recording system as claimed in claim 19, wherein the interval between the electron generating source and the data recording layer is controlled such that after the electrons have been emitted by the electron generating source, the electrons are rotated once, or an integer multiple number of times, during cyclotron movement.

21. The data recording system as claimed in claim 20, wherein the electron generating source comprises a micro-tip for emitting electrons using an electric field, and a gate electrode for controlling electron emission from the micro-tip.

22. The data recording system as claimed in claim 21, wherein the interval between the gate electrode and the micro-tip and/or the interval between the gate electrode and the media may be controlled.

23. The data recording system as claimed in claim 22, wherein the magnetic field generating source forms a magnetic field perpendicular to the data recording layer.

24. The data recording system as claimed in claim 21, wherein the magnetic field generating source forms a magnetic field perpendicular to the data recording layer.

25. The data recording system as claimed in claim 20, wherein the interval between the gate electrode and the micro-tip and/or the interval between the gate electrode and the media can be controlled.

26. The data recording system as claimed in claim 25, wherein the magnetic field generating source forms a magnetic field perpendicular to the data recording layer.

27. The data recording system as claimed in claim 20, wherein the magnetic field generating source forms a magnetic field perpendicular to the data recording layer.

28. The data recording system as claimed in claim 20, wherein an electron detector for detecting scattered electrons or secondary electrons generated by the media is further included between the electron generating source and the media.

29. The data recording system as claimed in claim 20, further comprising an ammeter for detecting current between gate electrode and the media with which electron beam collides.

30. The data recording system as claimed in claim 19, wherein the electron generating source comprises a micro-tip for emitting electrons using an electric field, and a gate electrode for controlling electron emission from the micro-tip.

31. The data recording system as claimed in claim 30, wherein the interval between the gate electrode and the micro-tip and/or the interval between the gate electrode and the media may be controlled.

32. The data recording system as claimed in claim 31, wherein the magnetic field generating source forms a magnetic field perpendicular to the data recording layer.

33. The data recording system as claimed in claim 30, wherein the magnetic field generating source forms a magnetic field perpendicular to the data recording layer.

34. The data recording system as claimed in claim 19, wherein the interval between the gate electrode and the micro-tip and/or the interval between the gate electrode and the media can be controlled.

35. The data recording system as claimed in claim 34, wherein the magnetic field generating source forms a magnetic field perpendicular to the data recording layer.

36. The data recording system as claimed in claim 19, wherein the magnetic field generating source forms a magnetic field perpendicular to the data recording layer.

37. The data recording system as claimed in claim 19, wherein an electron detector for detecting scattered electrons or secondary electrons generated by the media is further included between the electron generating source and the media.

38. The data recording system as claimed in claim 19, further comprising an ammeter for detecting current between gate electrode and the media with which electron beam collides.

39. Media for a data recording system, comprising:
a data recording layer in which a phase change is generated through electron absorption, wherein the data recording layer includes a grooved dielectric layer formed on the data recording layer, and a phase change material exposed by the grooves of the dielectric layer; and
a conductive substrate for supporting the data recording layer.

40. Media for a data recording system, comprising:
a data recording layer in which a phase change is generated through electron absorption, wherein the data recording layer includes a phase change material layer formed on the entire surface of the substrate, and an insulation layer having channels formed at a predetermined spacing on the phase change material layer, the channels exposing the phase change material layer; and
a conductive substrate for supporting the data recording layer.

41. A tracking method for a data recording system, comprising:
preparing media having grooves exposing a data recording layer in which a phase change is generated through electron absorption;
generating electrons according to data for recording using an electron generating source at a position separated from the data recording layer by a predetermined interval;
forming a magnetic field on the path of the electrons by disposing one pole of a magnet above the data recording layer and disposing an opposite pole of the magnet below the data recording layer, and cyclotron moving the electrons;
transmitting the cyclotron moved electrons onto the data recording layer;
detecting secondary electrons or scattered electrons generated by the media from above both sides of the groove into which an electron beam is transmitted; and
adjusting the position of the electron generating source according to the amount of secondary electrons or scattered electrons detected, such that the same amount of electrons within a predetermined range are detected at each side of the groove.

* * * * *